April 28, 1942.  W. B. BRONANDER  2,281,263
DRIVE TRANSMITTING MECHANISM
Filed April 12, 1941   3 Sheets-Sheet 2

INVENTOR
Wilhelm B. Bronander
BY
Marshall & Hawley
ATTORNEYS

April 28, 1942.  W. B. BRONANDER  2,281,263
DRIVE TRANSMITTING MECHANISM
Filed April 12, 1941  3 Sheets-Sheet 3
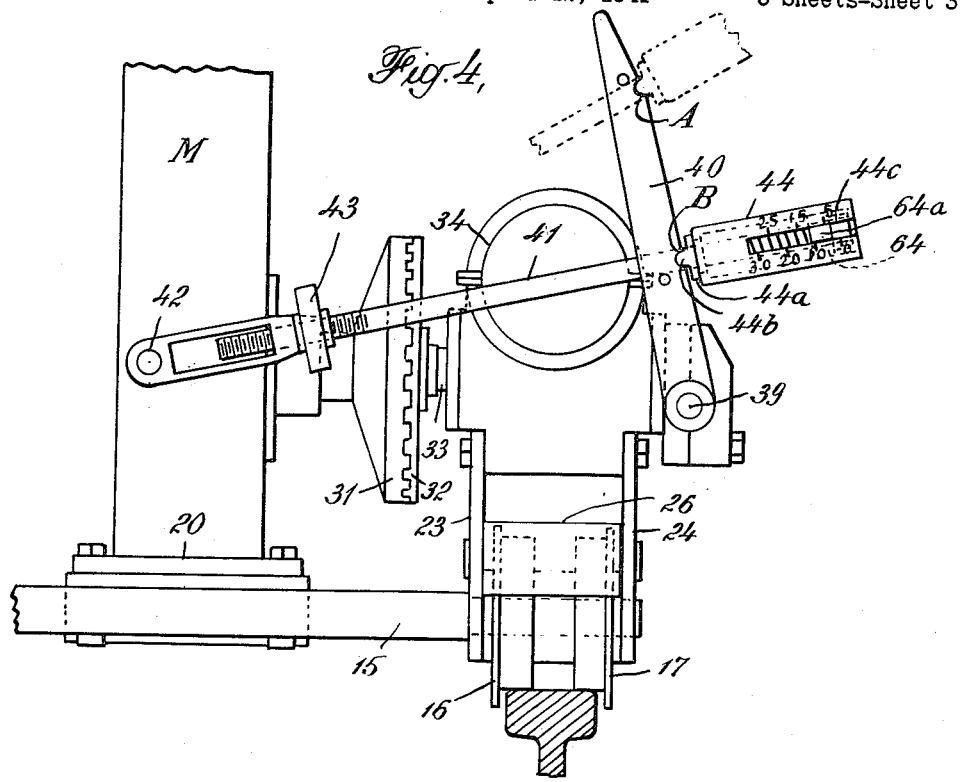
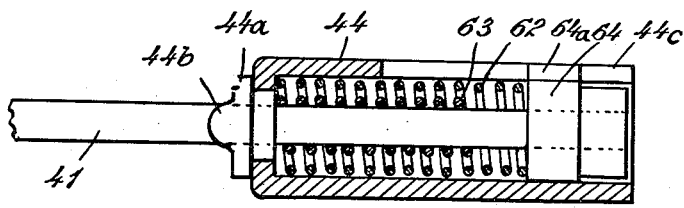
INVENTOR
Wilhelm B. Bronander
BY
Marshall & Hawley
ATTORNEYS Patented Apr. 28, 1942

2,281,263

UNITED STATES PATENT OFFICE 2,281,263

DRIVE TRANSMITTING MECHANISM

Wilhelm B. Bronander, Montclair, N. J.

Application April 12, 1941, Serial No. 388,203

5 Claims. (Cl. 74—411)

This invention relates to drive transmitting mechanism.

More particularly stated, the invention relates to mechanism for throwing out or cutting off the drive from a power shaft to a shaft driven thereby under predetermined torque conditions or when predetermined resistance to rotation is encountered.

Levers having adjustable weights thereon have been used to releasably hold in clutches or friction driving connections, but in drives where a heavy torque is encountered such an arrangement is not satisfactory since the weighted lever jumps on sudden encounter with a heavy torque resistance and the drive is intermittently connected and disconnected causing a chattering or rapid oscillation of the lever.

This invention has for its salient object to provide a driving connection and control therefor so constructed and arranged as to overcome the above difficulty and to disconnect the driven when the driven shaft encounters predetermined resistance to rotation.

Another object of the invention is to provide adjustable means for holding the clutch in, so arranged as to be capable of ready adjustment to meet the conditions encountered when the drive is transmitted at slow speed and at high speed.

Further objects of the invention will appear from the following specification taken in connection with the drawings which form a part of this application, and in which Fig. 1 is a longitudinal elevation partly in section of a track machine having incorporated therein driving mechanism constructed in accordance with the invention;

Fig. 4 is an end elevation of the structure shown in Fig. 1 taken at right angles thereto and looking at the left hand end of the machine; and Fig. 5 is an enlarged sectional elevation showing the adjustable control mechanism for holding in the clutch or automatically releasing the clutch when predetermined resistance is encountered.

Figure 1:
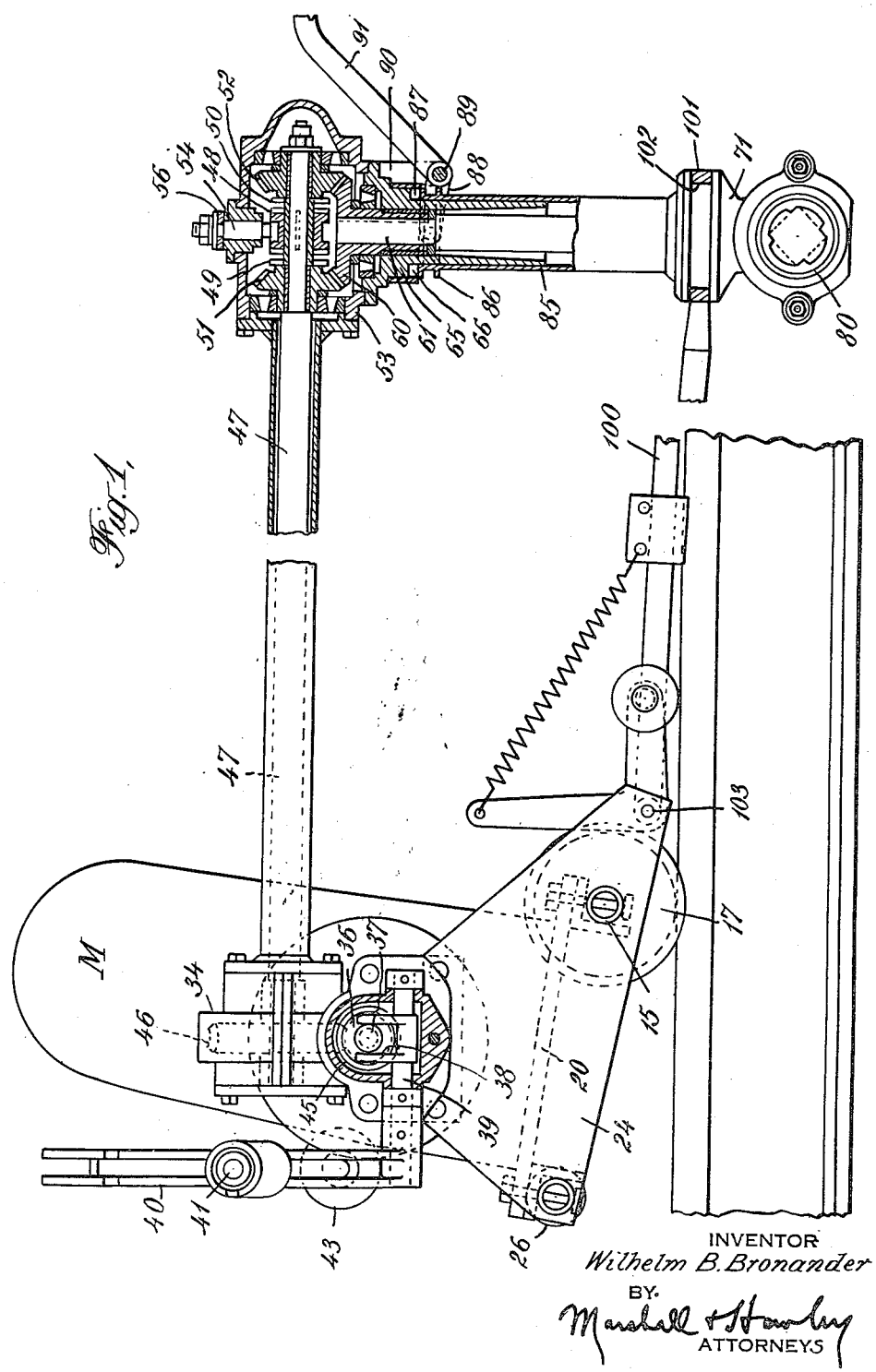
Figure 2:
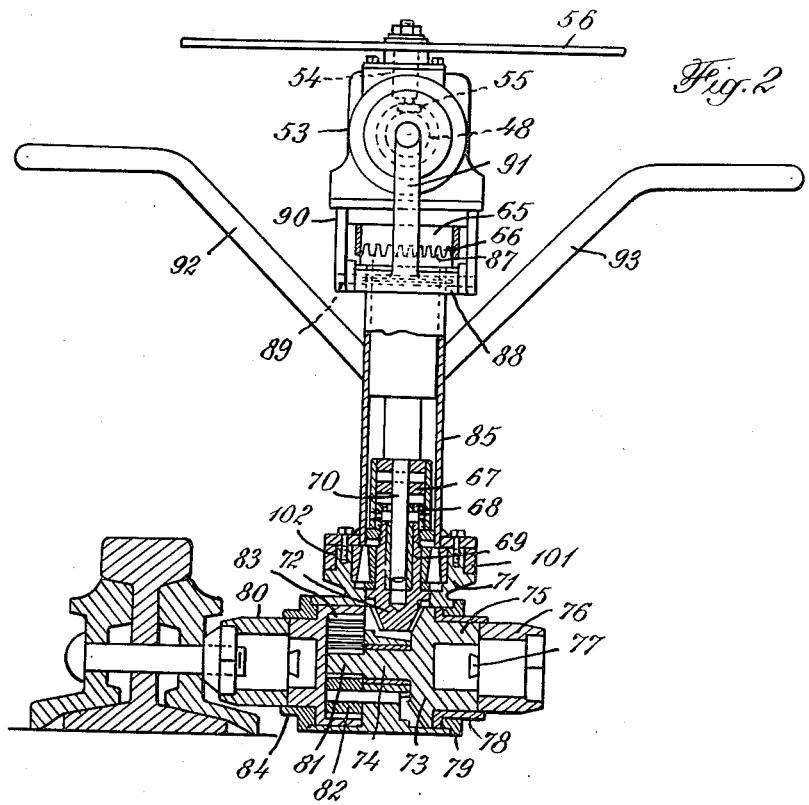
Fig. 2 is a vertical sectional elevation through the operating head or range of the machine shown in Fig. 1.

The invention briefly described consists of a driving connection between two shafts and control mechanism therefor, the shafts comprising a driving shaft and a driven shaft so constructed and arranged that when the second shaft encounters a predetermined resistance to rotation the connection will be automatically thrown out by positive actuating means incorporated in the driving connections from the driven shaft. The control mechanism for holding in the driving connections or clutch is so constructed and so connected to the driving connections that it can be so adjusted as to accommodate the drive to different degrees of resistance to rotation and to different speeds of operation of the tool driven thereby.

Further details of the invention will appear from the following description.

In the particular embodiment of the invention illustrated in the drawings, the apparatus or machine is mounted on an axle 15 having flanged wheels 16 and 17 at one end thereof and a cylindrical roller, not shown, at the other end thereof.

A motor M, such as a gasoline engine, is mounted on a bed plate 20 carried by frame members mounted on the axle. The driving connections are carried by a frame comprising members 23 and 24 mounted on the axle 15, a roller 26 being mounted between the members 23 and 24 and being disposed at the rear end thereof.

The motor M drives an engine shaft 30 on the outer end of which is mounted a clutch member 31 disposed in engagement with a clutch member 32 carried by a shaft 33 mounted in a casing 34 which in turn is mounted on the frame formed by the frame members 23 and 24. The shaft 33 which carries the clutch member 32 is mounted in bearings 35 slidably carried by the frame members 23 and 24 and the outer end of shaft 33 carries a thrust bearing 36 beyond which projects a head 37.

Pressure is exerted against the thrust bearing and shaft by a lever arm 38 which is bifurcated and straddles the head 37. The arm 38 is carried by a pivotally mounted spindle 39. The other arm 40 of the lever is also carried by the spindle 39, arms 38 and 40 forming a bell crank lever which acts to cause the disks or clutch members 31 and 32 to engage and transmit the drive from the motor shaft 30 to the shaft 33.

In order to adjustably hold in the clutch members 31 and 32 there is provided a pivoted tension rod 41 which is mounted on a fixed pivot 42 and is adjustable at length by a turn buckle 43. The lever arm 40 comprises two parallel bars and the tension rod 41 extends between the bars, as shown in Fig. 4, and has mounted on its outer end a spring tension device comprising a sleeve 44 which bears against a washer 44a having a projection or protuberance 44b adapted to seat in any one of a plurality of notches formed in the bars which comprise the lever arm 40, two such notches being shown in Fig. 4 and designated A and B.

The sleeve 44 houses a pair of springs 62 and 63, the spring 62 seating at one end against a flange on the end of the sleeve and the upper end against a nut 64 which is threaded on the outer end of the tension rod 41. The nut 64 has a lug 64a which projects into a longitudinally extending slot 44c formed in the sleeve 44. As the sleeve is rotated on the tension rod 41, the nut will move along the rod and vary the tension on the tension spring 62 and thereby vary the pressure which holds the lever 40, 38 and thereby retains the clutch members 31 and 32 in operative engagement. The sleeve 44 is suitably graduated to indicate the pressure to which the device is adjusted, the graduations being shown on Fig. 4.

The spring 63 is a buffer spring which normally does not function, but which assists in taking up the shock when an excessive torque resistance is encountered by the drive. The adjustment of the sleeve on the tension rod will thus determine the tension to be placed on the bolt or nut on which the tool is being operated and will determine how tightly the nuts will be screwed on as the nuts are run on the bolts.

The shaft 33 in the form of the invention illustrated has mounted thereon a worm 45 which meshes with a worm gear 46 keyed to a transmission shaft 47. The front end of the transmission shaft has splined thereon a clutch member 48 which is slidably mounted and is adapted to engage complementary clutch members 49 or 50 carried by or formed on bevel gears 51, 52.

The parts mentioned in the preceding paragraph are enclosed in a casing 53 and a stud or spindle 54 is rotatably mounted in the top of the casing and has formed on the lower end thereof an offset pin 55 which engages the clutch member 48. A handle 56 is secured to the upper end of the spindle or stud 54 and by rotating the stud by means of the handle the clutch member 48 can be moved to engage one or the other of the complementary clutch members 49, 50.

The gears 51 and 52 mesh with a bevel gear 60 which is mounted on the upper end of a vertical shaft 61 which extends downwardly through the casing 53. The direction of drive of the gear 60 and shaft 61 will depend on which of the gears 51 or 52 is driven by the clutch member 48.

The casing 53 has extending downwardly therefrom a sleeve 65 having depending teeth 66, the sleeve and teeth surrounding the shaft 61 and being spaced therefrom. The shaft 61 has connected to the lower end thereof a clutch member 67 which is adapted to engage a complementary clutch member 68 carried by the upper end of a hollow shaft 69. The shaft 69 receives the lower end 70 of the shaft 61.

The shaft 69 is carried by a tool head casing 71 and has formed on or secured to the lower end thereof a bevel gear 72. This gear meshes with a gear 73 carried by a stub shaft 74 and has a sleeve 75 extending therefrom in a direction opposite to the shaft 74. A nut socket 76 is carried by the sleeve 75 and has a dove-tail connection 77 therewith, the socket being held in position on the sleeve by means of a sleeve 78 which surrounds the sleeve 75 and the inner portion of the socket 76. The sleeve 78 is secured in place by means of a flanged ring 79 which is bolted in position on the casing 71.

It will be obvious that as the shaft 61 is driven in the manner hereinbefore described that the shaft 69 will also be driven when the clutch members 67 and 68 are engaged and thus the gears 72 and 73 will rotate the nut socket 76.

In addition to the nut socket 76 carried by the casing 71 a second nut socket 80 is also carried by the casing and is driven at a reduced rate of rotation and in a direction opposite to the direction of the shaft 74 and socket 76. This is accomplished by a gearing comprising a pinion gear 81 connected to one end of the shaft 74, idler gears 82 meshing with and driven by the pinion 81 and a ring gear 83 which surrounds and meshes with the idler gears and is in turn connected to the socket 80. The socket 80 and ring gear are held in position by a collar 84 which is bolted to the casing or to the flanged ring 79.

Since the apparatus above described is used to tighten or unscrew nuts on the fish plate bolts both inside and outside of the rails, means is provided for so adjusting the tool head or casing 71 as to provide for proper engagement between the sockets carried thereby and the nuts. In order to accomplish this the tool head or casing 71 is mounted for angular adjustment around the axis of the shaft 61. A tubular casing 85 is secured to the casing 71 and extends upwardly therefrom around the shaft 61. The upper end of the tubular casing 85 has formed on or secured thereto a collar 86 having teeth 87 adapted to engage the teeth 66 formed on the sleeve 65. The collar 86 is engaged by arms 88 carried by a spindle 89 mounted in a bracket 90 secured to the casing 53. A lever arm 91 is also secured to the spindle 89 and by moving the lever arm up or down the arms 88 will also be moved, thus moving the tubular casing 85 in a vertical direction. When the tool head casing or socket casing is to be angularly adjusted the arm 91 is raised, thus freeing the teeth 87 from the teeth 66. This movement will also free the clutch members 67 and 68 from driving engagement with each other and the tubular casing 85 and parts carried thereby can be rotated to the desired position to bring the socket casing at the right angle to the rails to properly engage the nuts. After this position has been reached a downward pressure is exerted on the arm 91, thus moving the teeth 87 and 66 into engagement with each other, and by maintaining pressure on the arm 91 this engagement will be maintained. The movement of the sockets into engagement with the nuts can be controlled by handles 92 and 93 and the other hand of the operator can exert a pressure on the arm 91 and maintain the parts in their adjusted position.

The teeth of the clutch members 67 and 68 and the teeth 66 and 87 are so proportioned as to length that the clutch member teeth 67 and 68 will move out of engagement before the teeth 66 and 87 are freed and vice versa.

The casing 71 is further held and steadied during the use of the apparatus by means of a link 100 which is secured at its front end to a ring 101 which is mounted in a groove 102 formed in the casing 71 and thus the casing can swivel. The other end of the link 100 is pivoted on a stud 103 which extends between the front end portions of the side frames 23 and 24.

*Operation*

The driving connections operate as follows:

The casing 85 is first so adjusted relative to the casing 53 as to properly engage the nuts to be operated on. This is done by a manipulation of the arm 91 in the manner hereinbefore described. The clutch member 48 is so set as to drive the shaft 61 in the desired direction and the power derived from the engine M will then cause the nut to be screwed or unscrewed by the engagement with one of the sockets 76 or 80.

The driving mechanism above described when used for running on nuts will provide a predetermined driving torque which will tighten the nuts to such an extent as to place the desired and proper tension on the bolts. This tension can be regulated by the adjustment of the sleeve 42 on the rod 41.

Figure 3:
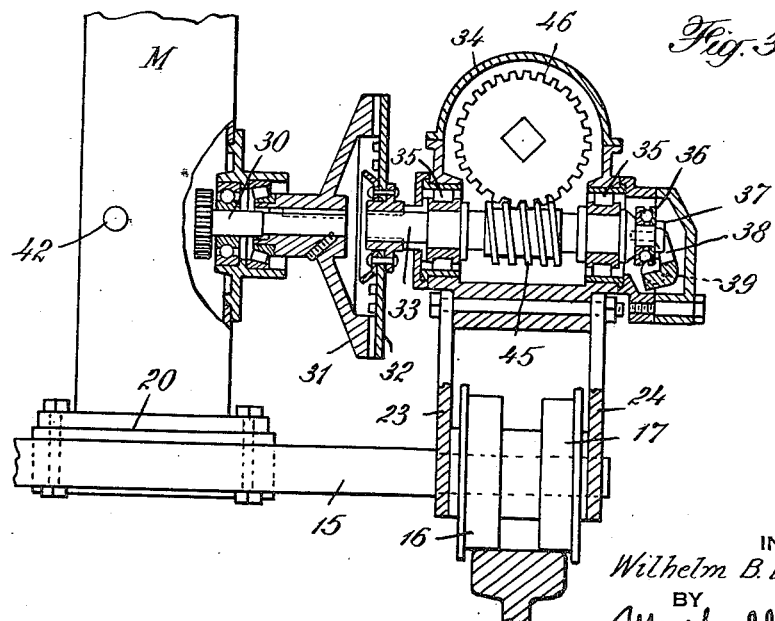
Fig. 3 is a vertical sectional elevation through the driving mechanism.

When the nut has been tightened to the desired torque the resistance to turning encountered by shafts 47 and 61 will stop these shafts and worm gear 46 carried by shaft 47 from rotating. When this happens the continued rotation of shaft 33 and worm 45 will cause the worm 45 and shaft 33 to move longitudinally against the pressure exerted by tension rod and lever 38, 40. As the shaft 33 moves to the right, viewing Fig. 3, the drive between members 31 and 32 will be disconnected.

The wrench socket is then removed from the nut and the clutch control lever 91 is manipulated to disconnect the drive from shaft 61 to the socket. Thereupon, the worm gear 46 is free to rotate and the tension rod will operate through lever 38, 40 to shift the shaft 33 and worm to the left, viewing Fig. 3, again connecting the drive from the motor shaft 30 to shaft 33.

The two adjustments for the tension rod 41, namely, at positions A and B shown at Fig. 4, are provided for accommodating the drive to operation at low speed or high speed through the tool head and tool driving connections. The adjustment B gives the desired tension for operation at low speed and the adjustment A gives the proper tension for operation at high speed. Thus, the machine can be easily and quickly adapted for operation under different driving conditions and, furthermore, the adjustable tension rod and lever control for the clutch mechanism will effectively hold in the clutch until a predetermined resistance is encountered and will, moreover, prevent any chattering or oscillation of the clutch lever when a heavy torque condition is encountered at high speed operation.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a drive shaft, a driven shaft, a member driven by said driven shaft, driving connections between said driven shaft and said member, a clutch for operatively connecting the drive shaft to the driven shaft, means including the driving connections between the driven shaft and member driven thereby for automatically and positively throwing out the clutch when the driven member encounters a predetermined resistance to rotation, and releasable means connected to the clutch for holding the clutch members in driving relation, said means including a lever, a rod, a member on said rod engaging the lever and an adjustable spring tension device on the rod engaging said lever engaging member.

2. In combination, a drive shaft, a driven shaft, a member driven by said driven shaft, driving connections between said driven shaft and said member, a clutch for operatively connecting the drive shaft to the driven shaft, means including the driving connections between the driven shaft and member driven thereby for automatically and positively throwing out the clutch when the driven member encounters a predetermined resistance to rotating, and releasable means connected to the clutch for holding the clutch members in driving relation, said means including a pivoted rod, a member on said rod engaging the lever and an adjustable spring tension device on the rod engaging said lever engaging member, said rod being movable on its pivot to cause said member to engage the lever at different distances from the lever fulcrum.

3. In combination, a drive shaft, a driven shaft, a member driven by said driven shaft, worm driving connections between said driven shaft and said member, a clutch for operatively connecting the drive shaft to the driven shaft, means including the driving connections between the driven shaft and member driven thereby for shifting said driven shaft axially and automatically and positively throwing out the clutch when the driven member encounters a predetermined resistance to rotation, and releasable means connected to the clutch for holding the clutch members in driving relation, said means including a lever, a rod, a member on said rod engaging the lever and an adjustable spring tension device on the rod engaging said lever engaging member.

4. In combination, a drive shaft, a driven shaft, a member driven by said driven shaft, driving connections between said driven shaft and said member, a clutch for operatively connecting the drive shaft to the driven shaft, means including the driving connections between the driven shaft and member driven thereby for automatically and positively throwing out the clutch when the driven member encounters a predetermined resistance to rotating, and releasable means connected to the clutch for holding the clutch members in driving relation, said means including a pivoted rod, a member on said rod engaging the lever and an adjustable spring tension device on the rod engaging said lever engaging member, said rod being movable on its pivot to cause said member to engage the lever at different distances from the lever fulcrum, and means on the lever engaging member and lever for holding the rod in predetermined positions on the lever.

5. In combination, a drive shaft, a driven shaft, a member driven by said driven shaft, a plurality of instrumentalities operatively connected to be driven by the driven member, means connected to the driven member and instrumentalities for driving said instrumentalities at different speeds, driving connections between said driven shaft and said member, a clutch for operatively connecting the drive shaft to the driven shaft, means including the driving connections between the driven shaft and member driven thereby for automatically and positively throwing out the clutch when the driven member encounters a predetermined resistance to rotation, and releasable means connected to the clutch for holding the clutch members in driving relation, said means including a lever, a rod, a member on said rod engaging the lever and an adjustable spring tension device on the rod engaging said lever engaging member, and means on the lever engaging member and lever for holding the rod in predetermined positions on the lever in accordance with the speed of drive of the instrumentality connected to the driven member.

WILHELM B. BRONANDER.